United States Patent [19]
Frost

[11] 3,797,685
[45] Mar. 19, 1974

[54] VEHICLE TOWING DEVICE
[76] Inventor: Darwin N. Frost, Box 428, Wapakoneta, Ohio 45895
[22] Filed: July 3, 1972
[21] Appl. No.: 268,462

[52] U.S. Cl. .................................. 214/334
[51] Int. Cl. ................................... B60b 29/00
[58] Field of Search .......... 214/330, 331, 332, 333, 214/334, 450, 451, 452, 453, 454; 280/482; 224/42.12, 42.26, 42.39; 188/112; 248/119 R, 361 A

[56] References Cited
UNITED STATES PATENTS

| | | | |
|---|---|---|---|
| 3,311,245 | 3/1967 | Galey | 214/334 |
| 3,361,277 | 1/1968 | Johnson et al. | 214/334 |
| 2,047,503 | 7/1936 | Wilson et al. | 248/119 R |
| 1,780,317 | 11/1930 | Snyder | 248/119 R |
| 2,620,201 | 12/1952 | Brady, Sr. | 280/482 |
| 3,505,815 | 4/1970 | Wherry | 188/112 |
| 2,558,418 | 6/1951 | Brueckman | 214/85.1 |
| 3,613,921 | 10/1971 | Ryden | 214/334 |
| 1,386,401 | 8/1921 | Grams | 224/42.26 |
| 3,659,761 | 5/1972 | Wesson | 224/39 R |
| 3,286,891 | 11/1966 | Jones, Jr. | 224/39 R |

Primary Examiner—Gerald M. Forlenza
Assistant Examiner—Lawrence J. Oresky
Attorney, Agent, or Firm—John W. Melville; Albert E. Strasser; Stanley H. Foster

[57] ABSTRACT

A vehicle towing device comprising a wheeled trailer having an undercarriage mounting a bed for receiving a pair of wheels of the vehicle being towed, the bed having wheel receiving wells and wheel retaining means adapted to engage and lock the wheels of the towed vehicle to the bed, together with detachable ramp means for positioning the wheels of the towed vehicle on the bed of the towing device.

13 Claims, 9 Drawing Figures

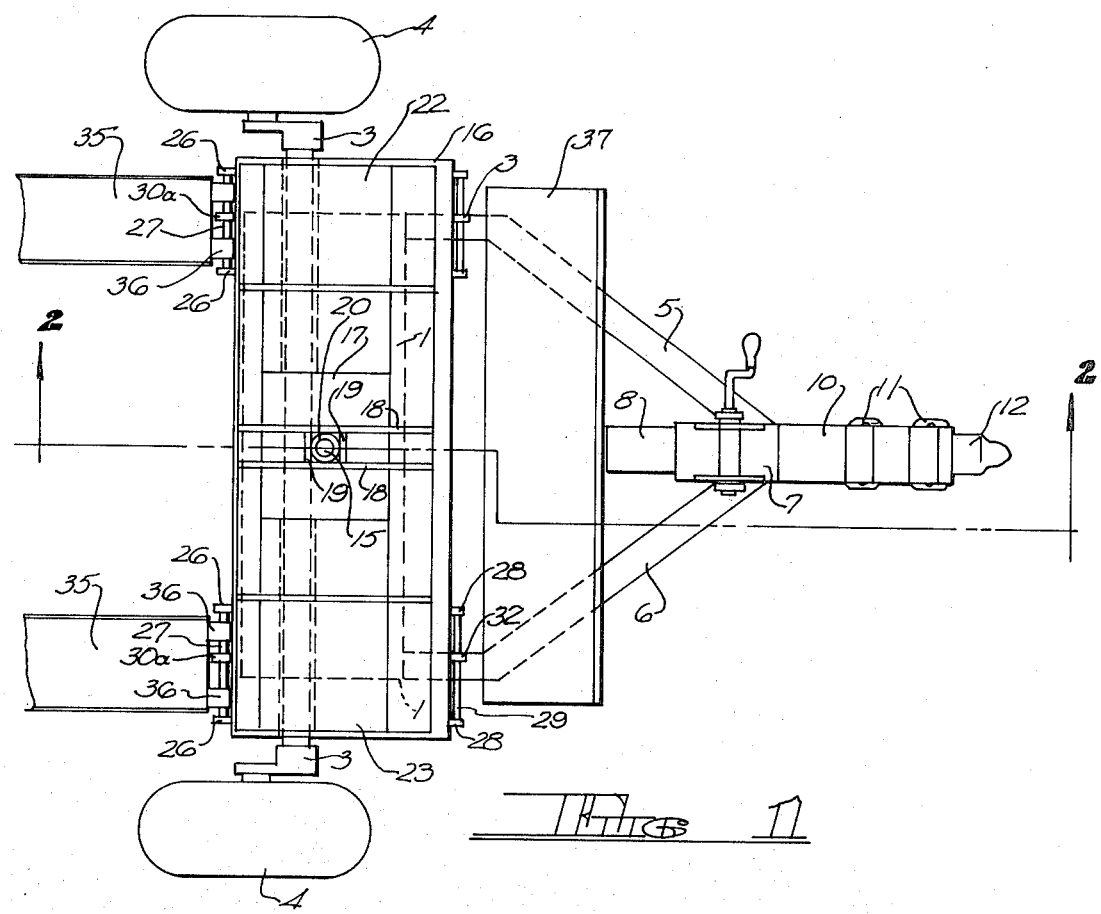
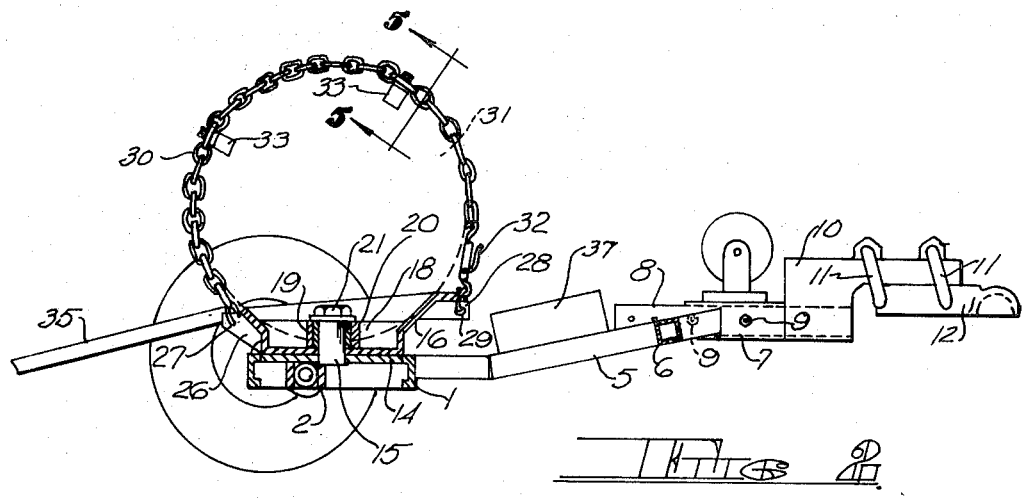

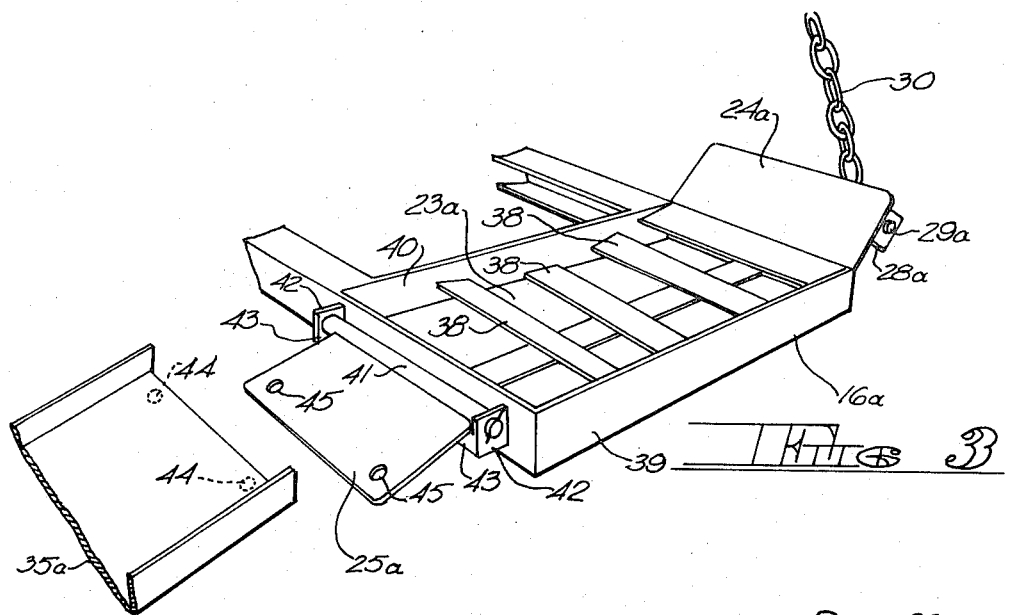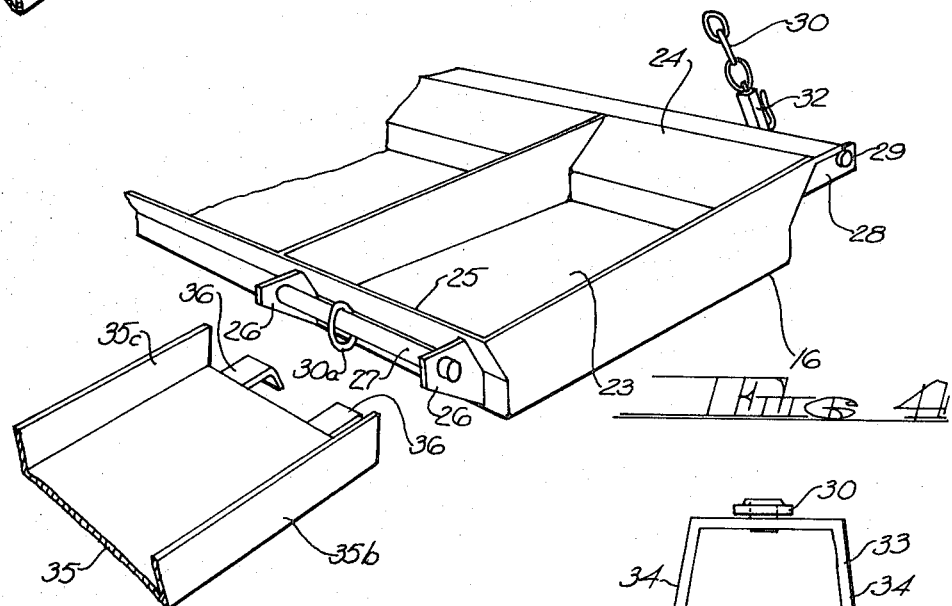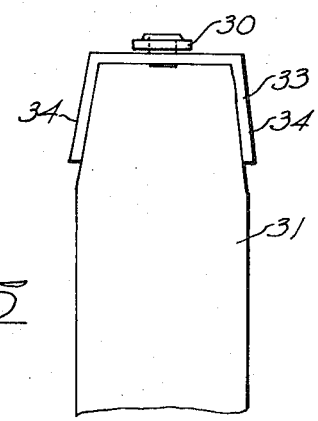

VEHICLE TOWING DEVICE

BACKGROUND OF THE INVENTION

The present invention relates to a towing device and more particularly to a trailer type device for towing another vehicle. While its utility is not so limited, the present invention is particularly suited for towing an automatic shift automobile, the trailer being adapted to receive the driving wheels so as to remove them from contact with the road while the vehicle is being towed. While various forms of trailers have hitherto been proposed, many of them have been cumbersome and quite expensive, while others have lacked the ability to closely follow the towing vehicle and have been unreliable insofar as the manner in which the towed vehicle is secured to the trailer, particularly insofar as lateral slippage of the vehicle relative to the trailer is concerned. Such lateral slippage provides a definite hazard, particularly during over-the-road towing, as where a passenger automobile is being towed in back of a motor home.

RESUME OF THE INVENTION

The present invention provides a two-wheeled towing device which is of relatively simple and inexpensive construction and yet affords the user maximum maneuverability and the assurance that the towed vehicle will closely follow the towing vehicle.

The towing device or trailer has an undercarriage mounting a forwardly projecting tongue provided with a hitch for pivotally connecting the trailer to the towing vehicle. A pair of wheels are secured to the undercarriage, the wheels preferably being mounted on a suspension system of known construction and of the type wherein the suspension performs a shock-absorbing function, the suspension being pivotally mounted relative to the undercarriage for movement in a vertical plane. Provision is also made for a surge brake — also of conventional construction — to automatically apply braking forces to the trailer wheels when the towing vehicle slows down and the inertia of the towed vehicle acts through the trailer tongue to energize the surge brake.

In a preferred embodiment of the invention, the bed of the trailer is rotatably mounted on the undercarriage by means of a pivot pin mounted on the longitudinal center line of the undercarriage, the pivot pin being positioned forwardly of the axis of rotation of the trailer wheels so that, when a vehicle is properly positioned on the trailer, the distribution of the weight load is such that the tongue of the trailer will tend to move downwardly so as to maintain the mating parts of the hitch carried by the trailer and by the towing vehicle, respectively, in tight engagement. The bed of the trailer will be configured to provide wheel receiving wells at its opposite ends, including inclined front and rear plates which form cradles for the wheels and coact with the locking means to securely fasten the wheels of the towed vehicle to the trailer.

The locking means for the wheels of the towed vehicle comprise locking chains adapted to extend about the wheels, the locking chains being adjustably secured to the front and rear inclined plates of the bed, the chains being provided with locking clamps to secure the chains in place; and the chains are additionally provided with wheel gripping means adapted to span the width of the tires of the towed vehicle to anchor the chains in place and secure the wheels of the towed vehicle against lateral displacement relative to the trailer bed.

Detachable ramp means are also provided to facilitate loading of the vehicle to be towed onto the trailer; and when not in use the ramp means may be readily removed and stored across the legs of the trailer tongue. A winch and cable also may be mounted on the tongue to permit the towed vehicle to be pulled up the ramps and placed on the trailer without having to drive it.

DESCRIPTION OF THE DRAWINGS

FIG. 1 is a plan view of a vehicle towing device in accordance with the invention.

FIG. 2 is a vertical sectional view taken along the line 2—2 of FIG. 1, the figure additionally illustrating the positioning of the wheel retaining means.

FIG. 3 is a fragmentary perspective view illustrating the construction of one form of bed and wheel well which may be employed.

FIG. 4 is a fragmentary perspective view similar to FIG. 3 but illustrating a preferred bed construction.

FIG. 5 is an enlarged fragmentary cross-sectional view taken along the line 5—5 of FIG. 4 and illustrating the gripping means forming a part of the wheel retaining means.

DESCRIPTION OF THE PREFERRED EMBODIMENTS

Figure 6:
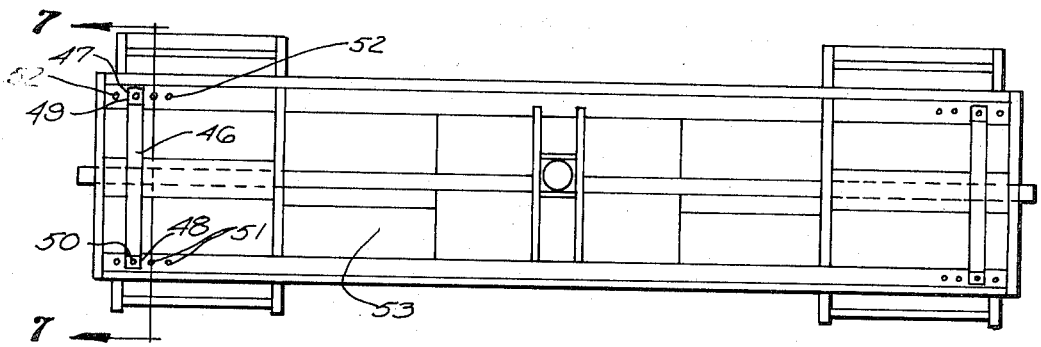
FIG. 6 is a plan view of a trailer bed provided with adjustable wheel retaining bars.

Referring first to FIGS. 1 and 2, a preferred towing device or trailer in accordance with the invention comprises an undercarriage 1 mounting an axle 2 having suspension means 3 at its opposite ends mounting a pair of wheels 4. The wheels will, of course, include tires and will be mounted on brake containing hubs, but for convenience will be referred to simply as wheels. The arms 5 and 6 of the tongue project forwardly from the undercarriage and are secured at their remote ends to a sleeve 7 which slidably receives an adjustable tongue member 8, the bolts 9 serving to secure the tongue member 8 within the sleeve 7 in the desired position. The tongue member 8 also mounts a surge brake 10 for actuating the brakes for the wheels 4, the surge brake being operatively connected through links 11 to the socket portion 12 of a trailer hitch, it being understood that the towing vehicle will mount the mating ball portion of the hitch. A cable winch 13 may be conveniently mounted on the sleeve 7 of the tongue for use in pulling the vehicle to be towed onto the trailer.

The undercarriage 1 includes a centrally disposed plate or other support 14 mounting a vertically disposed pivot pin 15 projecting upwardly therefrom along the longitudinal center line of the trailer. The pivot pin 14 is offset forwardly with respect to the axle 2 and hence to the axis of rotation of the wheels 4, thereby placing the center of gravity of the trailer in front of the wheels and hence loading the tongue so that the socket portion of the hitch 12 will bear downwardly on the supporting ball portion (not shown) which is attached to the towing vehicle. A bed 16 is pivotally mounted on the undercarriage, the bed preferably having a centrally disposed supporting plate or similar support 17 provided with sets of braces 18 and 19 mounting a pivot pin receiving sleeve or hub 20. A suitable locking bolt 21, as seen in FIG. 2, may be provided to secure the bed to the undercarriage.

The length of the bed will be such that it will readily accommodate the wheels of the vehicle to be towed, and it will be provided at its opposite ends with wheel wells 22 and 23 in which the vehicle wheels may be received.

In the embodiment of the invention illustrated in FIG. 1, and also shown in fragmentary perspective in FIG. 4, the bed is of essentially shallow tray configuration having an upwardly and outwardly inclined integral front wall 24 and an upwardly and outwardly inclined integral rear wall 25, which effectively provide cradles for the wheels. In this embodiment, pairs of brackets 26 project rearwardly from the outer surface of the wall 25, the brackets mounting chain bars 27; and similar brackets 28 project outwardly from the outer surface of front wall 24 and mount chain bars 29.

As will be evident from FIG. 2, a chain 30 is connected at one end to each of the chain bars 27 (one link of the chain being shown at 30a in FIG. 4), and the chain is of a length to extend about the circumference of the wheel 31 of the vehicle being towed, such wheel being indicated in dotted lines in FIG. 2. At its opposite end the chain mounts a locking latch 32 which engages the chain bar 29. When the latch is engaged and locked into position, the chain 30 will be drawn into tight engagement with the periphery of the wheel and hence will lock the wheel to the bed. It will be evident that the chain may be displaced along the chain bars 27 and 29 so that it may be accurately aligned with the center of each wheel.

To further insure a positive locking action, the chain 30 is provided with a plurality of spaced apart wheel gripping means 33 which, as best seen in FIG. 5, comprise elongated clamping bars having flanged ends 34 adapted to engage the opposite marginal side edges of the wheel. These bars coact with the chain to securely lock the wheel in place, and at the same time they effectively serve to prevent lateral slippage of the wheels. It will be understood, of course, that the position of the locking latch on the chain will be adjusted so that when the chain is locked in place, the rubber tire on the wheel will be radially compressed, and thus the resiliency of the tire itself enhances the locking action.

The rear chain bars 27 also perform an additional function in that they serve as supports for the ramp sections 35 which are adapted to extend between the pavement and the bed of the trailer. Thus, the ramp sections may be provided with flanged brackets 36, as best seen in FIG 4, which engage over the chain bars 27 and hence are positioned to guide the wheels of the vehicle being towed into the wells 22 and 23 in the bed. As also seen in FIG. 4, the ramps may be provided with upstanding side walls 35b and 35c; and, if desired, the ramps may each comprise foldable sections, depending upon the length desired. When not in use, the ramps may be conveniently stored in a suitable storage box or other fixture 37 mounted on the arms 5 and 6 of the trailer tongue, or a suitable clamping means may be provided to secure the ramp sections to the arms of the tongue.

FIG. 3 illustrates a modified form of bed 16a formed from bar and angle stock, the well 23a in this instance being defined by a series of bars 38 extending between the crossbars 39 and 40, the bars 38 being disposed relative to each other and to the crossbars 39 and 40 to define a well. An inclined front wall is, in this instance, defined by the plate 24a welded to the bed; and the plate mounts brackets 28a and a chain bar 29a as in the case of the embodiment of FIG. 4. In this instance, however, the rear wall plate 25a is pivotally mounted, being secured to a support bar 41 rotatably journaled at its opposite ends in brackets 42, the brackets having inwardly extending stops 43 which determine the lowermost position of the plate 25a, which is the position shown in FIG. 3. This is the loading position, and it will be noted that the ramp section 35a is provided with depending lugs 44 adapted to engage in the openings 45 in the plate 25a. After the vehicle has been loaded in place and the ramps removed, the plates 25a are then pivoted upwardly and the openings 45 engaged by the latches 32 of the chains, the positions of which have been reversed from that shown in FIG. 2, i.e., reversed from rear to front.

Figure 7:
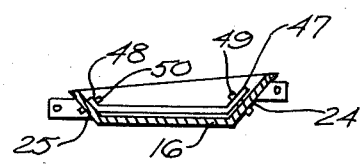
FIG. 7 is a vertical sectional view taken along the line 7—7 of FIG. 6.

FIGS. 6 and 7 illustrate a further means for securing the wheels of the vehicle being towed against slippage lengthwise of the bed during towing. Each of the wheel wells is provided with a wheel retaining bar 46 having its opposite ends flanged at 47 and 48 to seat against the front and rear inclined plates 24 and 25, respectively, the plates having attachment bolts 49 and 50 selectively engageable in spaced apart sets of openings 51 and 52 formed on the front and rear inclined plates. The retainer bars are thus adjustable so that they may be brought into close proximity to the outermost sides of the wheels when seated in the wells, thereby anchoring the wheels against lateral slippage when carried by the bed.

FIG. 6 also serves to illustrate the provision of chain storage bins 53 conveniently located immediately adjacent the wheel wells, the storage bins being adapted to receive the chains 30 when not engaged with the wheels of the vehicle being towed.

Figure 8:
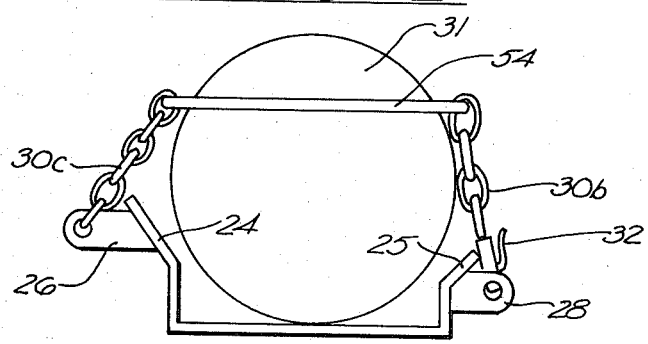
FIG. 8 is a side elevational view of a modified wheel retaining means.
Figure 9:
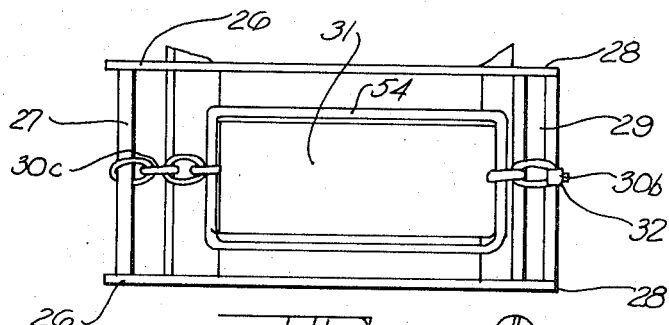
FIG. 9 is a plan view of the wheel retaining means illustrated in FIG. 8.

The wheel engaging chains and wheel gripping means may take different forms. A preferred arrangement is illustrated in FIGS. 8 and 9 wherein the chain sections 30b and 30c engage the opposite ends of a generally rectangular wheel gripping element 54 adapted to engage over the upper portion of the wheel 31 with the opposite ends of rectangular element 54 engaging the upper half of the wheel along lines lying on opposite sides of the axis of the wheel. The rectangular wheel gripping element thus surrounds the upper portion of the wheel and the opposite sides of the element prevent lateral slippage of the chain as well as the wheel itself. The dimensions of the rectangular element will be chosen so as to accommodate the widest and the largest diameter wheel encountered and in use, the primary limitation being that the length of the element will be sufficiently less than the diameter of the smallest wheel to be handled by the towing vehicle so that the ends of the element will firmly seat against the upper peripheral surface of the wheel.

As should now be apparent, the instant invention provides a relatively simple and yet highly effective and efficient trailer for towing another vehicle. The wheels of the towed vehicle are securely locked to the bed of the trailer; and yet the entire bed is free to rotate as the towing vehicle and the trailer negotiate corners and turns. Various modifications of the invention have already been set forth, and others will undoubtedly occur to the worker in the art upon reading this specification. For example, numerous types of suspensions for for the wheels of the trailer may be employed or a straight axle may be secured directly to the undercarriage.

The structural details of the manner in which the bed is pivotally mounted on the undercarriage may be modified as strength requirements dictate. Indeed, the wheel retaining means of the present invention may be utilized in conjunction with towing trailers having a fixed rather than a rotatable bed, or with a fixed bed trailer having steerable wheels, the primary consideration being the provision of a bed having wheel wells which coact with the retaining means to securely fasten the wheels of the vehicle being towed to the bed of the trailer. The wheel gripping members 33 shown in FIG. 5 may be fixedly secured to the chains, although preferably they will be pivotally connected to the chains so that their positions may be adjusted as they are fitted on the wheels of the vehicle being towed; and in the case of the rectangular wheel gripping element 54 shown in FIGS. 8 and 9, the elements may be formed from bar or rod stock, or it may comprise rigid end bars with the opposite sides formed from lengths of chain or cable. The chains may be replaced with other forms of flexible members, such as cables provided at their ends with hooks or rings.

The embodiments of the invention in which an exclusive property or privilege is claimed are defined as follows:

1. In a vehicle towing trailer, an undercarriage having a pair of undercarriage supporting wheels and a forwardly projecting tongue, a bed mounted on said undercarriage, wheel wells at the opposite ends of said bed for receiving a pair of wheels of a vehicle to be towed, said wheel wells being defined in part by front and rear inclined plates, adjustable retaining bars in each wheel well extending between said front and rear inclined plates, wheel retaining means operatively connected to said front and rear inclined plates, said wheel retaining means including elongated flexible members adapted to engage about the peripheries of the wheels of the vehicle being towed, and latch means for drawing said flexible members into tight engagement with the said last named wheels.

2. The vehicle towing trailer claimed in claim 1 including means mounting the wheel retaining means for adjustment lengthwise of said bed, whereby said wheel retaining means may be centered with respect to the wheels of the vehicle being towed.

3. The vehicle towing trailer claimed in claim 2 including wheel gripping means mounted on said elongated flexible members.

4. The vehicle towing trailer claimed in claim 3 wherein said gripping means comprise elongated bars extending transversely of said elongated flexible members at spaced apart intervals, said bars terminating at their opposite ends in flanges adapted to engage the opposite marginal side edges of the wheels of the vehicle being towed.

5. The vehicle towing trailer claimed in claim 3 wherein said gripping means comprise elongated rectangular elements engageable over the upper portions of the wheels of the vehicle being towed.

6. The vehicle towing trailer claimed in claim 3 wherein said elongated flexible members comprise chains, and wherein the means mounting said flexible members for adjustment lengthwise of said bed comprise chain bars extending lengthwise of said bed in the areas of said wheel wells.

7. The vehicle towing trailer claimed in claim 6 including ramp sections adapted to be operatively connected to said rear inclined plates.

8. The vehicle towing trailer claimed in claim 7 wherein said ramp sections mount flanged brackets engageable with the chains bars mounted on said rear inclined plates.

9. The vehicle towing trailer claimed in claim 1 wherein said bed is rotatably mounted on said undercarriage for pivotal movement in a horizontal plane.

10. The vehicle towing trailer claimed in claim 9 wherein said bed is rotatably mounted on said undercarriage by means of a pivot pin lying on the longitudinal center line of said towing trailer and positioned forwardly of the axis of rotation of said undercarriage supporting wheels.

11. The vehicle towing trailer claimed in claim 1 wherein said tongue includes a pair of arms terminating forwardly at a centrally disposed sleeve, wherein said sleeve mounts a longitudinally adjustable tongue member, and wherein a trailer hitch is mounted on the forward end of said adjustable tongue member.

12. The trailer towing device claimed in claim 11 wherein a surge brake interconnects said tongue member and said trailer hitch.

13. The vehicle towing device claimed in claim 12 including a cable winch mounted on said tongue.

* * * * *